US007648351B2

(12) United States Patent
Schluesselbauer

(10) Patent No.: US 7,648,351 B2
(45) Date of Patent: Jan. 19, 2010

(54) DEVICE FOR APPLYING A RELEASE AGENT TO A MOLDING RING FOR A FRONT CENTERING SHOULDER OF A TUBULAR OR ANNULAR WORKPIECE

(76) Inventor: Johann Schluesselbauer, Obergmain 2, A 4674 Altenhof am Hausruck (AT)

( * ) Notice: Subject to any disclaimer, the term of this patent is extended or adjusted under 35 U.S.C. 154(b) by 61 days.

(21) Appl. No.: 11/998,069

(22) Filed: Nov. 28, 2007

(65) Prior Publication Data

US 2008/0124417 A1 May 29, 2008

(30) Foreign Application Priority Data

Nov. 29, 2006 (AT) ............................ A 1981/2006

(51) Int. Cl.
*B28B 7/38* (2006.01)
*B29C 33/58* (2006.01)

(52) U.S. Cl. ......................... 425/95; 118/232; 118/244; 118/258; 118/259; 425/96

(58) Field of Classification Search ................... 425/95, 425/96; 118/232, 244, 258, 259
See application file for complete search history.

(56) References Cited

U.S. PATENT DOCUMENTS

| | | | | |
|---|---|---|---|---|
| 4,294,533 A * | 10/1981 | Bratt et al. | .................. | 118/259 |
| 5,194,584 A * | 3/1993 | Leahy | ..................... | 106/38.24 |
| 5,849,086 A * | 12/1998 | Boelkins | ..................... | 118/259 |
| 7,211,151 B2 * | 5/2007 | Takekoshi | .................. | 118/259 |

FOREIGN PATENT DOCUMENTS

| | | |
|---|---|---|
| DE | 101 18 082 | 10/2002 |
| EP | 418 388 | 3/1991 |
| JP | 01-316211 | * 12/1989 |
| WO | WO 98/41373 | * 9/1998 |

* cited by examiner

*Primary Examiner*—James Mackey
(74) *Attorney, Agent, or Firm*—Collard & Roe, PC

(57) ABSTRACT

A device is described for applying a release agent to a molding ring (1) for a front centering shoulder of a tubular or annular workpiece made of concrete having an application unit connected to a pump for the release agent. To provide advantageous application conditions, it is suggested that the application unit for the release agent have an application roll (4) preferably adapted to the profile of the molding ring (1), whose rotational axis (5) at least approximately runs in a diameter plane of the molding ring (1).

7 Claims, 1 Drawing Sheet

DEVICE FOR APPLYING A RELEASE AGENT TO A MOLDING RING FOR A FRONT CENTERING SHOULDER OF A TUBULAR OR ANNULAR WORKPIECE

CROSS REFERENCE TO RELATED APPLICATIONS

Applicant claims priority under 35 U.S.C. §119 of Austrian Application No. A 1981/2006 filed Nov. 29, 2006.

1. Field of the Invention

The present invention relates to a device for applying a release agent to a molding ring for a front centering shoulder of a tubular or annular workpiece made of concrete having an application unit attached to a pump for the release agent.

2. Description of the Prior Art

The front centering shoulders of tubes or shaft rings made of concrete are molded with the aid of molding rings which are placed on the annular chamber, fillable with concrete, between an exterior mold and an interior mold to terminate this annular chamber on the bottom and/or shape its concrete filling, to be withdrawn from the concrete only after the demolding of the workpiece and extensive curing of the concrete. The adhesion of the concrete to the molding ring is prevented by a release agent, which is usually applied to the molding rings in liquid form directly before use, with the aid of nozzles attached to a pump, which ensure uniform distribution of the sprayed release agent over the mold faces of the molding ring coming into contact with the concrete. These known application units have the disadvantage, however, that because of the spraying of the release agent, on one hand, an environmental strain is to be expected and, on the other hand, the excess component of the sprayed release agent must be collected and reprocessed.

SUMMARY OF THE INVENTION

The preset invention is therefore based on the object of designing a device of the type described at the beginning for applying a release agent in such a way that especially cost-effective use of the release agent is possible, without impairing the uniform distribution of the release agent on the mold faces of the molding ring.

The present invention achieves the stated object in that the application unit for the release agent has an application roll preferably adapted to the profile of the molding ring, whose rotational axis at least approximately runs in a diameter plane of the molding ring.

By using an application roll, the release agent may be applied to the molding ring without environmental strain. However, uniform release agent application over the entire mold face of the molding ring must be ensured. This generally requires at least adequate adaptation of the application roll to the profile of the molding ring, so that the profiled application roll presses snugly against the molding ring in consideration of its elastic deformability and paints completely over the mold faces upon a rotation of the molding ring, independently of whether the ring shape of the workpiece, and thus of the molding ring, is circular, oval, or even rectangular. In order that the application roll may be rolled around the circumference of the molding ring while maintaining this condition, the rotational axis of the application roll is to lie at least approximately in a diameter plane of the molding ring. The angle of the rotational axis of the application roll in relation to the ring axis of the molding ring may differ and is oriented above all according to the profile shape of the mold face of the molding ring to be provided with release agent.

The continuous contact of the application roll over the axial and radial extension of the mold face profile only ensures a uniform release agent application to the molding ring, however, if there is a uniform transition of the release agent from the application roll to the mold faces of the molding ring. This condition may be maintained in various ways, for example, by a brush roller or by a textile, in particular nonwoven sheath of the application roll which soaks up the release agent. An especially advantageous measure results in this context in that the application roll comprises an open-pored foam body seated on a hub. Such a foam body, typically made of soft foam, absorbs the supplied release agent into its pores and, because of its porosity, additionally ensures distribution of the release agent within the foam body, which supports the uniform delivery of the release agent on the mold faces of the molding ring along the entire contact area. Surprisingly, it has been shown that the varying peripheral velocities of the profiled application roll do not have any interfering influence on the release agent application, in particular if the application roll is not driven and solely rolls on the molding ring because of friction as a result of its free rotatability, so that a speed results on the basis of a mean peripheral velocity.

In order that simple adaptation of the application unit to various diameters of the molding rings to be provided with a release agent is possible, the application roll may be mounted on a carriage movable radially to the molding ring, with the aid of which the application roll is adjusted to the particular molding ring. If the application roll is mounted so it is pivotable upward around a transverse axis, the carriage, after setting to a predefined nominal diameter of the molding rings, does not have to be displaced to feed and remove the molding rings. In this case, it suffices to pivot the application roll away from the molding ring around the transverse axis after the application of the release agent, so that the molding ring may be removed from the device and a new molding ring may be conveyed into the device, before the application roll is pivoted back into the operating position.

The release agent may be delivered from the inside via the hub of the application roll. Simpler construction conditions result, however, if a supply line for the release agent is provided at a distance above the application roll, which has outlet openings for the release agent oriented toward the application roll, so that the release agent flows in a metered way out of the supply lines onto the surface of the application roll, which ensures an appropriate distribution because of its conductive function for the release agent. To achieve especially uniform release agent application, finally, the pump for the release agent may be activated as a function of the speed of the application roll. The effort connected thereto is generally not required, however, because a peripheral velocity of the molding rings which remains largely uniform may be assumed.

BRIEF DESCRIPTION OF THE DRAWING

The subject matter of the present invention is illustrated as an example in the drawing, a device according to the present invention for applying a release agent to a molding ring is shown in a simplified section.

DESCRIPTION OF THE PREFERRED EMBODIMENT

Figure 1:
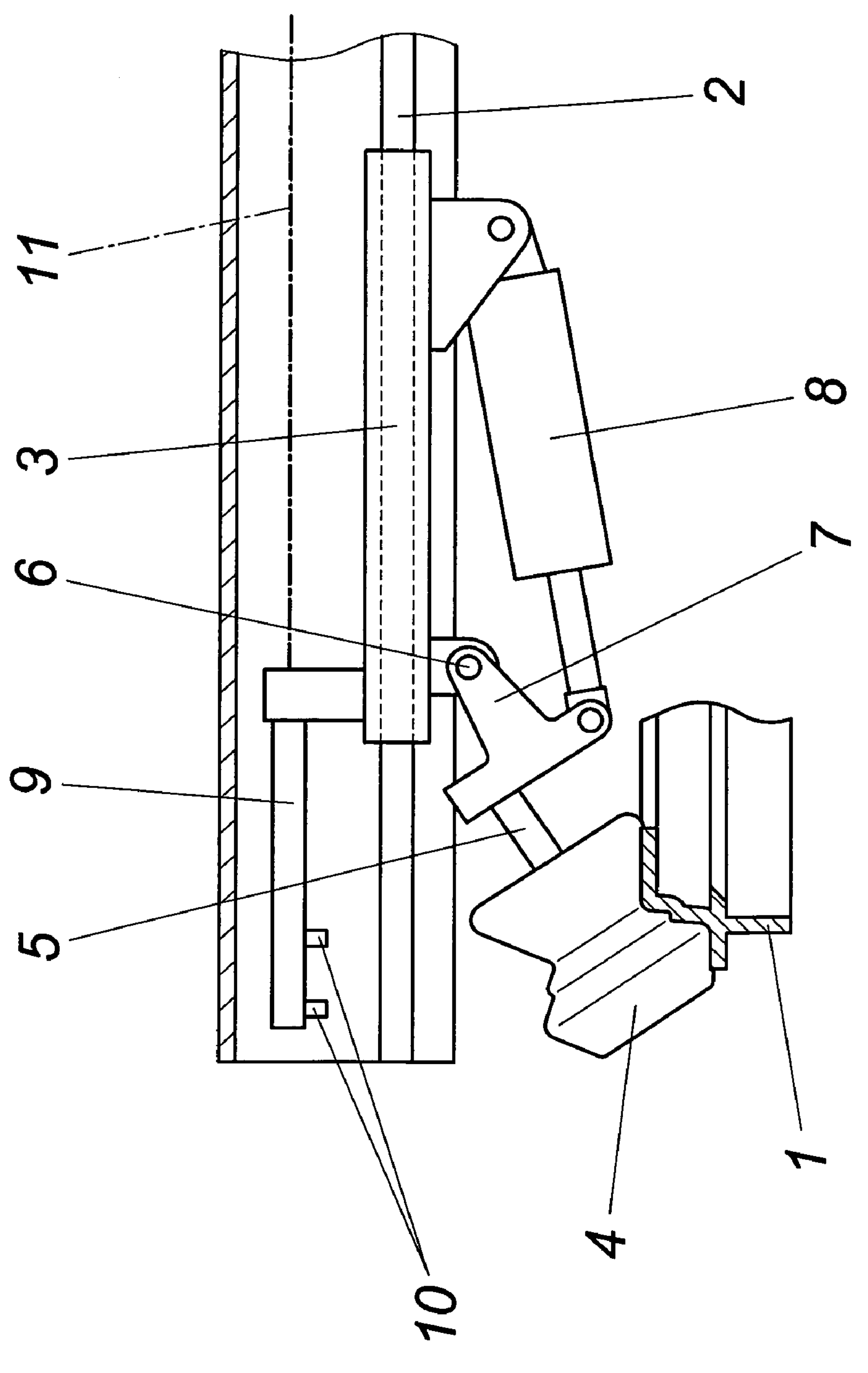

The device for applying a release agent to a molding ring 1 for a front centering shoulder of a tubular or annular workpiece made of concrete has, according to the illustrated exemplary embodiment, a guide 2 for a carriage 3, which carries an application roll 4 for the release agent, running radially to the molding ring 1. This application roll 4 is profiled at least approximately according to the profile cross-section of the molding ring 1 and comprises a roll body made of open-pored foam, which is drawn onto a hub. The hub of the application roll 4 is mounted so it is freely rotatable on an axis 5, which is carried by a setting lever 7 linked to the carriage 3 around a transverse axis 6. A pivot cylinder 8 linked to the carriage 3 engages on the setting lever 7 in such a way that the application roll 4 may be pivoted between the operating position shown and an idle position pivoted away from the molding ring 1 with the aid of the pivot cylinder 8.

In the operating position, the application roll 4 is pressed against the molding ring 1 at a contact pressure predefinable via the impingement of the pivot cylinder 8, so that upon a rotation of the molding ring 1, the application roll 4 rolls around the circumference of on the molding ring 1. The application roll 4 is supplied with liquid release agent via a supply line 9 running above the application roll, which is fed in a metered way to the application roll 4 via outlet openings 10 oriented toward the application roll 4. The supply line 9 is connected to a pump line 11, indicated by dot-dash lines, via which the release agent may be delivered by a metering pump to the application roll 4. The application roll 4 absorbs the release agent, which is generally delivered in drops, in the foam body, which ensures equalization of the release agent at least over a surface layer because of its porosity, before the release agent is transferred to the mold faces of the molding ring 1 at the contact area of the application roll 4 on the molding ring 1. The driving of the application roll 4 by the revolving molding ring 1 because of friction ensures a speed advantageous for the release agent application, which corresponds to an average peripheral velocity, so that the differences in regard to the peripheral velocity, which are unavoidable because of the profiling of the application roll 4, may not exert an influence which impairs the uniform release agent application. In this context, it is to be noted that the contact pressure of the application roll 4 predefined by the pivot cylinder 8 ensures the release agent is squeezed out of a surface layer of the elastically deformable foam body.

To take the velocity at which the application roll 4 is moved along the molding ring 1 into consideration in regard to an appropriate supply of the application roll 4, the release agent pump may be activated as a function of the speed of the application roll via a suitable control unit. Of course, still other parameters may be used for the control with the aid of such a control unit, such as the geometrical annular shape of the molding ring, the particular dimensions of the application roll, or the thickness of the release agent layer to be applied.

The ability to displace the carriage 3 along the guide 2 allows adaptation of the device to different nominal diameters of the molding rings 1 in a simple way. Deviations in the area of the profile cross-section or of the true running of the molding rings to be provided with a release agent because of tolerances are compensated for by the elastic yielding nature of the application roll 4.

The invention claimed is:

1. A device for applying a release agent to a molding ring for a front centering shoulder of a tubular or annular workpiece made of concrete having an application unit connected to a pump for the release agent, wherein the application unit for the release agent has an application roll adapted to the profile of the molding ring, whose rotational axis at least approximately runs in a diameter plane of the molding ring;

wherein relative rotatory movement of the application roll opposite the molding ring takes place around an axis of the molding ring.

2. The device according to claim 1, wherein the application roll comprises an open-pored foam body seated on a hub.

3. The device according to claim 1, wherein the application roll is mounted so as to be freely rotatable.

4. The device according to claim 1, wherein the application roll is mounted on a carriage which is movable radially to the molding ring.

5. The device according to claim 1, wherein a supply line for the release agent, which has outlet openings for the release agent oriented toward the application roll, is provided at a distance above the application roll.

6. The device according to claim 1, wherein the pump for the release agent is activatable as a function of the speed of the application roll.

7. A device for applying a release agent to a molding ring for a front centering shoulder of a tubular or annular workpiece made of concrete having an application unit connected to a pump for the release agent, wherein the application unit for the release agent has an application roll mounted so as to be pivotable upward around a transverse axis and whose rotational axis at least approximately runs in a diameter plane of the molding ring.

* * * * *